Nov. 24, 1964     E. L. UTLEY     3,158,148

DENTAL APPARATUS

Filed Oct. 11, 1963

INVENTOR.
EUEL LEE UTLEY
BY
Kimmel & Crowell
ATTORNEYS.

3,158,148
DENTAL APPARATUS
Euel Lee Utley, 1762 W. Santa Barbara Ave.,
Los Angeles, Calif.
Filed Oct. 11, 1963, Ser. No. 315,553
3 Claims. (Cl. 126—226)

This invention relates to a dental apparatus and more particularly to a means for maintaining a quantity of dental wax in a warm and molten condition, in its preferred form being used in cooperation with a stand member carrying holder means for supporting a rod-like dental tool with portions of the tool extending in contacting or overlying relationship to the means for heating the wax.

As conducive to a better understanding of the instant invention it should be understood that it is conventional in dental laboratories to maintain a quantity of dental wax in a warm or molten condition for use in a variety of processes. It is important that the wax be precluded from solidifying, but it must not be overheated.

In cooperation with the use of the dental wax, the technician frequently employs a variety of tool means such as spatulas, irons, or the like, and the use of these tool means is facilitated if the working portion of the same are heated to assist in melting and molding the wax with which they come in contact. All such tools are included in the claim-term "rod-like."

It is therefore a primary object of the instant invention to provide a dental apparatus for maintaining a quantity of dental wax in a warm and molten condition, the apparatus being sturdy and durable in construction, reliable and efficient in operation, and relatively simple and inexpensive to manufacture, utilize, and maintain, and being particularly adapted for use in cooperation with a means for heating a portion of a dental tool.

Another object of this invention is the provision of a device of the character described particularly designed for use with a conventional laboratory Bunsen burner.

Yet another object of this invention is the provision of such a device wherein the wax warmer may be adjustably secured to the gas tube of a conventional Bunsen burner to vary the amount of heat transferred to the wax.

Other and further objects reside in the combination of elements, arrangement of parts, and features of construction.

Still other objects will in part be obvious and in part be pointed out as the description of the invention proceeds and as shown in the accompanying drawing wherein.

Similar reference character refer to similar parts throughout the several views of the drawing.

Figure 1:
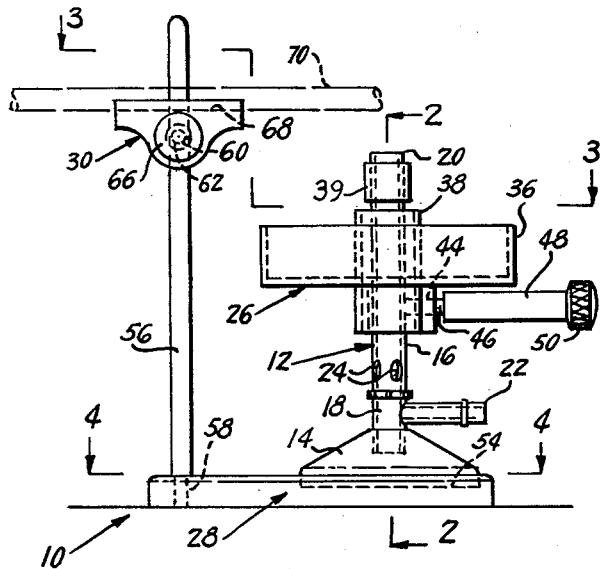
FIGURE 1 is a side elevational view of a dental apparatus in accordance with the instant inventive concept, certain hidden parts being shown in dotted lines, and a portion of a rod-like tool means being shown schematically in dotted lines.

Referring now to the drawing, a dental apparatus in accordance with the instant invention is designated generally by the reference numeral 10 and is designed particularly for use in conjunction with a conventional laboratory Bunsen burner 12 having a base portion 14 and a vertically extending gas tube 16 which is hollow and has a lower end 18 secured to the base portion 14 and an open upper end 20 from which emanates a jet of gas to be ignited in a well-known manner. The lower end 18 of the gas tube 16 includes means defining a gas inlet 22 to be attached to a flexible conduit (not shown) connected to a source of gas in a conventional manner. Draft apertures 24 for combustion air are also defined adjacent the lower end 18 of the gas tube 16.

The dental apparatus 10 is comprised basically of a wax warmer means designated generally as 26 and a stand member 28 supporting on rod 56 a tool holder means 30.

The wax warmer means 26 includes a container means 32 for receiving a quantity of wax, the container means 32 being annular in form and being defined by a substantially horizontally extending bottom portion 34, an upstanding peripheral side wall portion 36 terminating in a horizontal plane, and a vertically extending central sleeve portion 38 having a vertically extending central bore 40 defined therethrough dimensioned to receive in sliding relationship the gas tube 16 of the Bunsen burner 12. The central sleeve portion 38 is larger in internal diameter than gas tube 16 and includes a first portion extending from above 36 to the level of the bottom 34 and a second attaching portion 42 depending below the bottom portion 34 of the container means 32, and having a transversely extending threaded aperture 44 defined therethrough for receiving a threaded portion 46 of an attaching means defined by an adjusting screw 48 having a knurled head portion 50. The threaded portion 46 of the adjusting screw 48 is dimensioned to extend within the central bore 40 into securing engagement with the gas tube 16 of the Bunsen burner 12. Vertically extending, circumferentially spaced, thin aligning rib members 52 are secured internally of the attaching portion 42 of the central sleeve 38 to facilitate attachment to the gas tube 16 and to space the container means 32 therefrom but to allow air to flow upwardly therebetween.

The stand member 28 has portions 54 in its horizontal plate-like base defining a recess dimensioned to receive the base portion 14 of the Bunsen burner 12 and includes a rod member 56 horizontally spaced from 54 and threadably secured at 58 and extending above the upper end 20 of the Bunsen burner 12.

The tool holder means 30 has a vertically extending bore 60 defined therethrough dimensioned to slidingly receive the rod member 56 and includes a threaded aperture 62 for receiving the threaded portion 64 of a locking means in the form of a screw member having a knurled head 66, the threaded portion 64 being of a dimension to extend within the vertically extending bore 60 into securing engagement with the rod member 56. A substantially horizontally extending open ended trough 68 is defined in the upper surface of the holder means 30 to receive a portion of a dental tool such as a spatula, iron, or the like 70 in resting relationship. The trough is rotatable in a horizontal plane, for a full circle, and is dimensioned of a length to present, in all positions, a side clearance with respect to the container.

Figure 2:
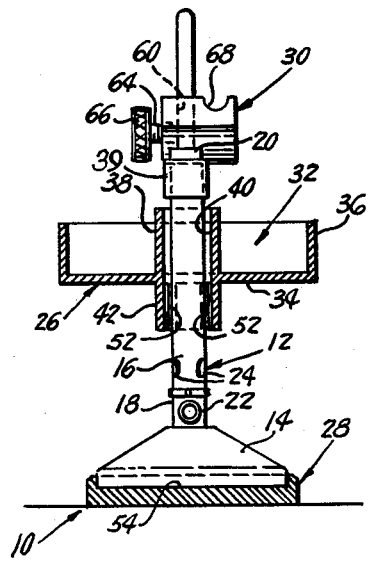
FIGURE 2 is a vertical cross-sectional view taken substantially on line 2—2 of FIGURE 1.
Figure 3:
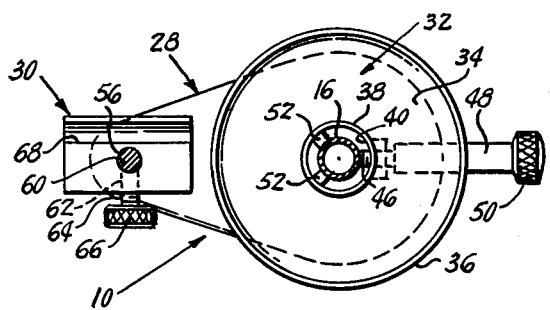
FIGURE 3 is a transverse cross-sectional view taken substantially on line 3—3 of FIGURE 1.
Figure 4:
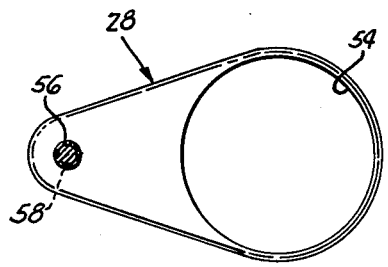
FIGURE 4 is a transverse cross-sectional view taken substantially on line 4—4 of FIGURE 1 showing a portion of the stand member with the Bunsen burner removed.

An annular band 39 is fixed near the top of gas tube 16 and vertically spaced above the illustrated (FIGURES 1 and 2) position of sleeve 38. The band is of such diameter as to make a sliding fit within the central opening of the sleeve. The height of the band is equal to a major portion of the height of the first or upper portion of the sleeve. Raising the container 32 (above the positions of FIGURES 1 and 2) so that 32 and 40 overlap, closes the gas channel between the gas tube and the container and provides a conductive heat flow path from the gas tube to the container.

The use and operation of the dental apparatus of the instant invention will now be apparent. The wax warmer means 26 is slid over the upper end 20 of the Bunsen burner 12 and positioned at a point intermediate the upper and lower ends 20 and 18, respectively, of the gas tube 16, being secured in place by the attaching means 48. Annular band 39 is then fitted tightly on the top of gas tube 16. A quantity of wax (not shown) placed in the annular recess of container means 32 will be warmed and maintained in a molten condition by heat convection across the annulus between tube and sleeve by heat conduction through ribs 52, the amount of heat provided increasing as the container means approaches the upper end 20 thereof. Greater heat conduction is provided by overlapping band 39 and sleeve 38.

The base portion 14 of the Bunsen burner 12 is received in the recess 54 to increase the stability of the assembly and to facilitate movement thereof as necessary. A rod-like tool means 70 may be rested in a trough 68 of the holding means 30 with its tip or any other desired portion extending in overlying relationship to the flame (not shown) emanating from the upper end 20 of the Bunsen burner 12, the holder means 30 being rotated and slid on the rod member 56 until the tool means 70 is positioned as desired.

As there is a horizontal or side clearance between the ends of the tool holder trough 68 and the side wall 36 of the container, the holder means may be changed from (1) a position in which the trough bottom is coplanar with the top of side wall 36 to (2) a position in which the trough bottom is directed towards any portion of the flame or even above the flame. In each above position the trough and rod are rotatable in a horizontal plane for a full circle of 360°. Thus the tool may be kept within a wide range of temperature.

One particularly desirable tool temperature would be near that of the wax in the container. This is obtained with applicant's structure by selecting position (1) above and adjusting the tool and its holder so that the tool end can conductively contact the container ring at two spaced apart points, providing four flows of conductive heat along the tool end, each flow approximating a range of temperature near that of the container.

It will now be seen that there is herein provided an improved dental apparatus which satisfies all the objectives of the instant invention and others, including many advantages of great practical utility and commercial importance.

Since many embodiments may be made of the instant inventive concept, and since many modifications may be made of the embodiments hereinbefore shown and described, it is to be understood that all matter herein is to be interpreted merely as illustrative, and not in a limiting sense.

I claim:

1. A dental apparatus including a Bunsen burner having a base portion and a vertically extending gas tube with a lower end secured to the base portion and including means defining a gas inlet, an adjustable air inlet, and an open upper end, also an open top container means for receiving and keeping warm a quantity of wax, said container including an upstanding peripheral outer wall, a vertical central sleeve with a central opening therein of greater internal diameter than the outer diameter of said gas tube, and a substantially flat bottom between said wall and said sleeve, said sleeve possessing a first portion extending from above the height of said outer wall to said bottom and spaced from the gas tube, and a second portion in contact with said tube and extending from said bottom towards but stopping short of said air inlet, a plurality of thin circumferentially spaced apart rib means integral with said second portion of said sleeve and extending towards and making a sliding fit with the adjacent gas tube, and threaded means circumferentially spaced from each of said rib means and passing horizontally through said sleeve and variably contacting said gas tube to attach said container at desired heights thereon.

2. The structure of claim 1 and in addition thereto, an annular band fixed near the top of said gas tube and above the first portion of said sleeve, and of a diameter which is slightly less than that of the central opening of the central sleeve, the height of said band being equal to a major portion of the height of said first portion of said sleeve, whereby upon raising the container into overlapping and sliding relationship with said band, fluid flow between gas tube and sleeve is stopped and the conductive heat transfer from tube to container is increased.

3. A dental apparatus including a Bunsen burner having a circular base portion with a vertically extending gas tube, means to admit gas to the tube base and means to adjustably admit combustion air to said tube, a horizontal-plate stand member with a circular recess at one end, said recess positioning and receiving the base portion of said Bunsen burner, and a fixed vertically extending rod member horizontally spaced from said recess, a round open top container with a peripheral side wall terminating at its top in a horizontal plane, a deep annular recess therewithin, said container being adjustably fixed at desired heights along the upper portion of said gas tube, tool holder means having a top surface including an open ended horizontal trough dimensioned to receive a rod-like dental tool, a vertically extending bore dimensioned to slidingly receive said rod member, and a bore intersecting threaded aperture carrying a threaded locking means, whereby said rod-like dental tool may rest in various horizontal positions along said trough, and the trough may be oriented horizontally throughout a full circle, the longitudinal dimension of the troughed tool holder being of a length to present a side clearance between the ends of the trough and a peripheral side wall of the open top container, whereby when the bottom of the trough is at the same height as the top of said peripheral side wall of said container, the tool end may simultaneously contact said side wall top at a plurality of points to thereby assume approximately the same temperature as the container, and whereby when said holder is elevated above the top of the gas tube, said tool end may be positioned at desired locations within or adjacent the flame from the gas tube to thereby assume higher temperatures than said container.

References Cited by the Examiner

UNITED STATES PATENTS

| | | | |
|---|---|---|---|
| 697,326 | 4/02 | Claude | 263—9 |
| 1,180,735 | 4/16 | Murray | 126—229 |
| 1,487,377 | 3/24 | Gaynor | 126—229 |
| 1,536,079 | 5/25 | Dalton | 263—5 |
| 1,569,903 | 1/26 | Wilton | 158—111 X |
| 1,606,400 | 11/26 | Cheney | 23—259 |
| 1,726,345 | 8/29 | Donaldson | 126—226 X |
| 1,974,075 | 9/34 | Lieboff | 23—292 X |
| 2,185,838 | 1/40 | Duerr | 248—124 X |
| 2,499,945 | 3/50 | Burrell | 248—124 |

JAMES W. WESTHAVER, *Primary Examiner.*